United States Patent
Nagumo et al.

(10) Patent No.: US 8,821,333 B2
(45) Date of Patent: Sep. 2, 2014

(54) PLANETARY GEAR MECHANISM

(75) Inventors: Kouji Nagumo, Anjo (JP); Hiromichi Ota, Kariya (JP); Tomohiro Honda, Okazaki (JP); Yoshiharu Suzuki, Kariya (JP); Yoshinobu Katoh, Toyohashi (JP)

(73) Assignee: JTEKT Corporation, Osaka-shi (JP)

( * ) Notice: Subject to any disclaimer, the term of this patent is extended or adjusted under 35 U.S.C. 154(b) by 323 days.

(21) Appl. No.: 13/375,087

(22) PCT Filed: Jun. 9, 2010

(86) PCT No.: PCT/JP2010/059775
§ 371 (c)(1),
(2), (4) Date: Nov. 29, 2011

(87) PCT Pub. No.: WO2011/001801
PCT Pub. Date: Jan. 6, 2011

(65) Prior Publication Data
US 2012/0088623 A1  Apr. 12, 2012

(30) Foreign Application Priority Data

Jun. 30, 2009 (JP) ................................. 2009-154918
Feb. 24, 2010 (JP) ................................. 2010-038735

(51) Int. Cl.
*F16H 1/32* (2006.01)
(52) U.S. Cl.
CPC ............ *F16H 1/32* (2013.01); *F16H 2001/326* (2013.01); *F16H 2001/325* (2013.01)
USPC ...................................................... 475/178
(58) Field of Classification Search
USPC .................... 475/168, 178, 180, 181
See application file for complete search history.

(56) References Cited

U.S. PATENT DOCUMENTS

| 4,429,595 A | 2/1984 | Butterfield |
| 2009/0156347 A1 | 6/2009 | Suzuki |

(Continued)

FOREIGN PATENT DOCUMENTS

| CN | 101233342 A | 7/2008 |
| EP | 1 916 444 A1 | 4/2008 |

(Continued)

OTHER PUBLICATIONS

Extended Search Report issued May 10, 2012 in European Patent Application No. 10793971.2-1254/2450595.

(Continued)

*Primary Examiner* — Robert A Siconolfi
*Assistant Examiner* — Huan Le
(74) *Attorney, Agent, or Firm* — Oblon, Spivak, McClelland, Maier & Neustadt, L.L.P.

(57) ABSTRACT

A planetary gear mechanism of the invention includes a housing, an input shaft that has an eccentric portion whose center lies on an eccentric axis that is displaced from an axis of input and output shafts, and is supported by the housing to be rotatable about the axis of the input and output shafts relative to the housing, an oscillating face plate that eccentrically oscillates via the eccentric portion, such that its rotation relative to the housing is restricted, and an output shaft to which an internally toothed gear that internally contacts and meshes with an externally toothed gear formed on the oscillating face plate is mounted, and which is rotatable about the axis of the input and output shafts relative to the housing. As the input shaft rotates, a circumferential position at which the externally toothed gear and the internally toothed gear mesh with each other changes, and rotation of the input shaft is delivered at a reduced speed to the output shaft. First pins that protrude from the oscillating face plate engage with insert holes formed in the housing, so that rotation of the oscillating face plate is restricted.

17 Claims, 5 Drawing Sheets

(56) References Cited

U.S. PATENT DOCUMENTS

2010/0267509 A1    10/2010    Suzuki
2011/0133541 A1    6/2011    Makino et al.

FOREIGN PATENT DOCUMENTS

| | | | |
|---|---|---|---|
| EP | 1916444 A1 | * | 4/2008 |
| GB | 926 266 | * | 5/1963 |
| GB | 2 062 143 A | | 5/1981 |
| JP | 39 4008 | | 2/1964 |
| JP | 49-93765 | | 9/1974 |
| JP | 4993765 | * | 9/1974 |
| JP | 61-136041 | | 6/1986 |
| JP | 61136041 A | * | 6/1986 |
| JP | 61 252937 | | 11/1986 |
| JP | 62 11223 | | 3/1987 |
| JP | 05 3698 | | 1/1993 |
| JP | 2002 266955 | | 9/2002 |
| JP | 2006 142931 | | 6/2006 |
| JP | 2008 089144 | | 4/2008 |
| JP | 2009 024841 | | 2/2009 |
| KR | 10-0896547 B1 | | 5/2009 |
| WO | WO 2009/028278 A1 | | 3/2009 |

OTHER PUBLICATIONS

U.S. Appl. No. 13/379,244, filed Dec. 19, 2011, Nagumo, et al.
International Search Report Issued Sep. 7, 2010 in PCT/JP10/059775 Filed Jun. 9, 2010.
Office Action and Search Report issued on Dec. 31, 2013 in the corresponding Chinese Patent Application No. 201080029067.8 (with English Translation).

* cited by examiner

PLANETARY GEAR MECHANISM

TECHNICAL FIELD

The present invention relates to a planetary gear mechanism.

BACKGROUND ART

A speed reducer having a planetary gear mechanism is used for reducing the speed of rotation of a motor, for example. As one type of the planetary gear mechanism, there is widely known a planetary gear mechanism having a first shaft, an externally toothed gear mounted on the first shaft via an eccentric body provided on the first shaft so as to be eccentrically rotatable relative to the first shaft, an internally toothed gear which the externally toothed gear internally contacts and meshes with, and a second shaft coupled to the externally toothed gear via a means for transmitting only the rotational component of the externally toothed gear. As a specific example of this type of planetary gear mechanism, a cycloid differential planetary gear mechanism is known.

The speed reducer using the cycloid differential planetary gear mechanism achieves a large speed reduction ratio with one reduction stage, and operates with a high efficiency owing to a high contact ratio, as compared with a planetary gear mechanism having general gears of an involute tooth profile. On the other hand, the speed reducer of the cycloid type has a complicated mechanism for taking output out of eccentric oscillating rotation, and is likely to be available at a high cost.

A general cycloid differential planetary gear mechanism causes an epitrochoid externally toothed gear to internally contact a pin gear as an internal gear and eccentrically oscillate, so as to provide output via inner pins. In order to cancel out an imbalance due to the eccentric arrangement, an externally toothed gear having the same structure as and opposite in phase to the above-indicated externally toothed gear is added, or two pieces of externally toothed gears having the same structure and shifted in phase by 120° from each other in terms of the direction of displacement of the center are added (see Patent Document 1).

However, the known cycloid differential planetary gear mechanism makes it necessary to machine grooves in which pins are to be embedded, with high accuracy. so as to provide a circular arc inner gear formed by the pins. Furthermore, the pins need to be provided over the entire circumference of the inner gear, and the highly accurate machining needs to be done for the number of the pins.

Also, the epitrochoid gear of the externally toothed gear that externally contacts the pins is required to be machined with high accuracy.

Furthermore, the inner pins that extend through the externally toothed gear need to be provided, and high accuracy is also required for the positions and size of holes through which the inner pins extend.

Thus, high machining or working accuracy is required for each of components that constitute the known cycloid differential planetary gear mechanism, resulting in a problem of increase in cost.

Furthermore, the overall construction of the known cycloid differential planetary gear mechanism is complicated, and the inner pins are arranged to extend through the externally toothed gear; therefore, there is a limitation to reduction of the outside diameter thereof.

PRIOR ART DOCUMENT

Patent Document

Patent Document 1: JP-A-2002-266955

DISCLOSURE OF THE INVENTION

Object to be Attained by the Invention

The present invention has been developed in view of the above-described actual situations, and an object of the invention is to provide a planetary gear mechanism that achieves reduction in size and is available at a low cost.

Arrangement for Attaining the Object

To attain the above object, a planetary gear mechanism includes a first member, a second member that has an internally toothed gear formed in an inner circumferential surface thereof, and is rotatable relative to the first member about an axis of input and output shafts, an oscillating member that is formed in an annular shape, and includes an externally toothed gear that is formed in an outer circumferential surface thereof to be able to mesh with the internally toothed gear, such that the number of teeth of the externally toothed gear is smaller than the number of teeth of the internally toothed gear, the oscillating member being formed so as to oscillate relative to the second member, so that only a circumferential portion of the externally toothed gear meshes with the internally toothed gear, the oscillating member being able to oscillate relative to the first member while rotation thereof relative to the first member is restricted, and a third member including an eccentric portion having an outer circumferential surface whose center is displaced from the axis of input and output shafts, the eccentric portion being operable to rotate about the axis of input and output shafts while supporting an inner circumferential surface of the oscillating member, thereby to oscillate the oscillating member, or being rotated about the axis of input and output shafts due to oscillation of the oscillating member. In operation, driving force is applied to the third member to oscillate the oscillating member, and move a circumferential position at which the externally toothed gear and the internally toothed gear mesh with each other, so that the driving force is delivered at a reduced speed to at least one of the first member and the second member, or driving force is applied to at least one of the first member and the second member so as to move a circumferential position at which the externally toothed gear and the internally toothed gear mesh with each other, and oscillate the oscillating member, so that the driving force is delivered at an increased speed to the third member. The planetary gear mechanism is characterized in that a first pin protrudes from one member of the oscillating member and the first member to the other member in a direction of the axis of input and output shafts, and the other member is formed with an insert hole into which the first pin is inserted, so that rotation of the oscillating member relative to the first member is restricted via the first pin.

The planetary gear mechanism is characterized in that the externally toothed gear is formed by a plurality of second pins that protrude from the oscillating member in the direction of the axis of input and output shafts.

The planetary gear mechanism is characterized in that the oscillating member includes a pair of side faces that face in opposite directions in the direction of the axis of input and output shafts, that the first pin protrudes from one of the side faces of the oscillating member, and the second pins protrude from the other side face of the oscillating member, and that the first pin and the second pins are formed on the same circumference.

The planetary gear mechanism is characterized in that at least one of the second pins and the first pin are formed on the same axis.

The planetary gear mechanism is characterized in that at least one of the second pins and the first pin are formed integrally with each other to form a long pin.

The planetary gear mechanism is characterized in that the number of the first pins is smaller than the number of the second pins.

The planetary gear mechanism is characterized in that a remainder of the second pins is not formed integrally with the first pin, but forms short pins that are shorter than the long pins, and that the long pins and the short pins are alternately provided in a circumferential direction of the oscillating member about a center located at a position different from the axis of input and output shafts.

The planetary gear mechanism is characterized in that the internally toothed gear has a hypotrochoid tooth profile.

The planetary gear mechanism is characterized in that the first pin has a pin body, and a collar that is rotatably fitted on the pin body.

The planetary gear mechanism is characterized in that each of the second pins has a pin body, and a collar that is rotatably fitted on the pin body.

The planetary gear mechanism is characterized in that a first support bearing is disposed in a radial spacing between the eccentric portion of the third member and the oscillating member.

The planetary gear mechanism is characterized in that a part of the second member is inserted in a central portion of the third member, and that a second support bearing is disposed between the third member and the above-indicated part of the second member inserted in the third member.

The planetary gear mechanism is characterized in that the second support bearing is disposed between the eccentric portion of the third member and the above-indicated part of the second member inserted in the third member.

The planetary gear mechanism is characterized in that the planetary gear mechanism is a speed reducing mechanism in which the third member serves as an input shaft, and the second member serves an output shaft.

The planetary gear mechanism is characterized in that the second member is a housing that rotatably supports the first member and the third member, that the first member is an output shaft that delivers driving force applied to the third member, at a reduced speed, that the first pin protrudes from the oscillating member, and that the insert hole into which the first pin is inserted is formed in the first member.

The planetary gear mechanism is characterized in that the third member has a counter balancer that cancels out unbalanced rotation of the eccentric portion.

The planetary gear mechanism is characterized in that the counter balancer comprises a light-weight hole formed by partially hollowing the third member.

The planetary gear mechanism is characterized in that a needle bearing is mounted on a distal end portion of the first pin, and that the insert hole restricts rotation of the oscillating member via the needle bearing.

The planetary gear mechanism is characterized in that the third member is driven by an electric motor, that a case of the electric motor is formed integrally with the first member or the second member, and that an output shaft of the electric motor and the third member are integrally formed.

A planetary gear mechanism includes a fixed housing that supports an input shaft and an output shaft such that the input shaft and the output shaft are rotatable about a common axis of the input and output shafts, a first shaft that is one of the input shaft and the output shaft, and has an eccentric portion whose center lies on an eccentric axis that is displaced from the axis of the input and output shafts, a second shaft that is the other of the input shaft and the output shaft, and is provided with an internally toothed gear, and an oscillating member that is formed with an externally toothed gear that can mesh with the internally toothed gear, and a cylindrical portion supported at an inner circumferential surface thereof by the eccentric portion, such that the number of teeth of the externally toothed gear is smaller than the number of teeth of the internally toothed gear, the oscillating member being formed so as to oscillate relative to the second shaft, so that only a circumferential portion of the externally toothed gear meshes with the internally toothed gear, the oscillating member being able to oscillate relative to the housing while rotation thereof relative to the housing is restricted. In operation, driving force is applied to the first shaft to oscillate the oscillating member, and move a circumferential position at which the externally toothed gear and the internally toothed gear mesh with each other, so that the driving force is delivered at a reduced speed to the second shaft, or driving force is applied to the second shaft so as to move a circumferential position at which the externally toothed gear and the internally toothed gear mesh with each other, and oscillate the oscillating member, so that the driving force is delivered at an increased speed to the first shaft. The planetary gear mechanism is characterized in that a first pin protrudes from the oscillating member to the housing in a direction of the axis of the input and output shafts, and that the housing is formed with an insert hole into which the first pin is inserted, so that rotation of the oscillating member relative to the housing is restricted via the first pin.

A planetary gear mechanism includes a fixed housing that supports an input shaft and an output shaft such that the input shaft and the output shaft are rotatable about a common axis of the input and output shafts, and has an internally toothed gear, a first shaft that is one of the input shaft and the output shaft, and has an eccentric portion whose center lies on an eccentric axis that is displaced from the axis of the input and output shafts, a second shaft that is the other of the input shaft and the output shaft, and an oscillating member that is formed with an externally toothed gear that can mesh with the internally toothed gear, and a cylindrical portion supported at an inner circumferential surface thereof by the eccentric portion, such that the number of teeth of the externally toothed gear is smaller than the number of teeth of the internally toothed gear, the oscillating member being formed so as to oscillate relative to the housing, so that only a circumferential portion of the externally toothed gear meshes with the internally toothed gear, the oscillating member being able to oscillate relative to the second shaft while rotation thereof relative to the second shaft is restricted. In operation, driving force is applied to the first shaft to oscillate the oscillating member, and move a circumferential position at which the externally toothed gear and the internally toothed gear mesh with each other, so that the second shaft is rotated along with the oscillating member, and the driving force is delivered at a reduced speed to the second shaft, or driving force is applied to the second shaft so as to move a circumferential position at which the externally toothed gear and the internally toothed gear mesh with each other, and oscillate the oscillating member while rotating the oscillating member along with the second shaft, so that the driving force is delivered at an increased speed to the first shaft. The planetary gear mechanism is characterized in that a first pin protrudes from the oscillating member to the second shaft in a direction of the axis of the input and output shafts, and the second shaft is formed with an insert hole into which the first pin is inserted, so that rotation of the oscillating member relative to the second shaft is restricted via the first pin.

Effects of the Invention

In the planetary gear mechanism, as the third member as one of the input and output shafts rotates, the oscillating member makes eccentrically oscillating motion via the eccentric portion provided on the third member. Then, the externally toothed gear formed on the oscillating member eccentrically oscillates along with the oscillating member. The externally toothed gear externally contacts and engages (meshes) with the internally toothed gear provided on the second member, and the circumferential position of a meshing portion in which the externally toothed gear and the internally toothed gear mesh with each other moves due to the eccentrically oscillating motion of the oscillating member. As a result, relative rotation occurs between the first member that restricts rotation of the oscillating member and the second member, and a rotation output is delivered to the first member or the second member. The speed change ratio (reduction ratio) is determined by adjusting the number of teeth of the externally toothed gear provided on the oscillating member and the number of teeth of the internally toothed gear. Thus, the planetary gear mechanism of the invention changes (reduces) the speed of rotation of the third member as one of the input and output shafts, and delivers the rotation from the second member. By fixing the second member, it is also possible to change (reduce) the speed of rotation of the third member, and deliver the rotation from the first member.

Also, the planetary gear mechanism of the invention may change (increase) the speed of rotation of the first member or second member, and transmit the rotation to the third member. In this case, the rotation is transmitted via the first member or second member, the internally toothed gear, the externally toothed gear, the oscillating member, and the third member, in the order of description, while its speed is changed.

In the planetary gear mechanism of the invention, only the engaging faces of the externally toothed gear provided on the oscillating member and the internally toothed gear (the meshing faces of the gears) are required to be machined with high accuracy. In other words, the other members are not required to be machined with high accuracy. Namely, the planetary gear mechanism of the invention is advantageous in that the cost can be reduced by reducing highly accurate machining.

Also, motions (in particular, a rotational motion in the circumferential direction about the axis of the input and output shafts) of the oscillating member other than its eccentrically oscillating motion are restricted merely through engagement of the first pins that protrude from one member of the oscillating member and the first member with insert holes of the other member. It is thus possible to reduce the sizes of the oscillating member and the first member, and easily produce these members.

In the planetary gear mechanism, the externally toothed gear can be formed by the plurality of second pins. Thus, the externally toothed gear can be easily produced. Furthermore, since highly accurate parts that provide the second pins can be produced at a low cost, the planetary gear mechanism of the invention is advantageously available at a reduced cost.

In the planetary gear mechanism, the first pins and the second pins are formed on the same circumference, so that the outside diameter of the oscillating member required for provision of the first pins and second pins can be minimized, and the size of the planetary gear mechanism can be reduced.

In the planetary gear mechanism, at least one of the second pins and the first pin are formed on the same axis. To provide one first pin and one second pin, therefore, only one through-hole that extends through the opposite side faces of the oscillating member is required to be formed, which makes it easy to produce the planetary gear mechanism.

In the planetary gear mechanism, at least one of the second pins is formed integrally with the first pin; therefore, the cost can be advantageously reduced, as compared with the case where the second pin and the first pin are formed as separate bodies.

In the planetary gear mechanism, the number of the first pins is smaller than the number of the second pins; therefore, the diameter of the circumference on which the first pins are formed can be made smaller than the diameter of the circumference on which the second pins are provided, and the member on which the first pins and the second pins are formed can be reduced in size.

Namely, a specified number or larger number of the second pins must be provided for reducing surface pressures that act on the externally toothed gear that transmits rotary force. However, the number of the first pins that restrict rotation is determined with a relatively large degree of freedom or flexibility. Accordingly, the number of the first pins may be made smaller than the number of the second pins, and the first pins may be placed on a small-diameter circumference, while the second pins may be placed on a larger-diameter circumference than the first pins. With this arrangement, the first pins and the second pins may be reasonably positioned, and the member on which the first pins and second pins are formed can be reduced in size.

In the planetary gear mechanism, the long pins and the short pins are alternately provided along the circumferential direction of the oscillating member whose center lies on a position different from the axis of the input and output shafts. With this arrangement, the rotation of the oscillating member relative to the first member can be stably restricted, and the externally toothed gear can be smoothly engaged or meshed with the internally toothed gear.

In the planetary gear mechanism, the internally toothed gear has a hypotrochoid tooth profile, whereby the area of meshing with the externally toothed gear can be increased.

In the planetary gear mechanism, the first pin consists of a pin body and a collar. Namely, a contact face of the first pin with the mating material (the inner circumferential surface of the insert hole) is formed by the collar. The collar is arranged to be rotatable relative to the pin body; therefore, when the pin and the mating material are in sliding contact (under pressure) with each other, slipping between these members can be absorbed by the rotating collar. Namely, highly efficient meshing can be achieved.

Furthermore, a backlash in meshing with the mating material can be easily adjusted by adjusting the outside diameter of the collar.

In the planetary gear mechanism, each of the second pins consists of a pin body and a collar. Namely, a contact face of the second pin with the mating material (the internally toothed gear) is formed by the collar. The collar is arranged to be rotatable relative to the pin body; therefore, when the pin and the mating material are in sliding contact (under pressure) with each other, slipping between these members can be absorbed by the rotating collar. Namely, highly efficient meshing can be achieved.

Furthermore, a backlash in meshing with the mating material can be easily adjusted by adjusting the outside diameter of the collar.

In the planetary gear mechanism, the first support bearing is disposed between the eccentric portion and the oscillating member, so that eccentric rotation of the eccentric portion can be converted into oscillating rotation of the oscillating member. Also, the eccentric portion can receive radial stress applied to the oscillating member.

In the planetary gear mechanism, the axial positions of the third member and the second member coincide with each other, and the second support bearing is disposed between these members. With this arrangement, stress (reaction force produced upon meshing) applied radially inwards from the internally toothed gear to the externally toothed gear (the second pins) is transmitted to the second member via the oscillating member, the first support bearing, the eccentric portion of the third member and the second support bearing. With the second member thus receiving the stress (reaction force) transmitted thereto, transmission of rotation between the externally toothed gear (the second pins) and the internally toothed gear is effected without loss.

In the planetary gear mechanism, the second support bearing is disposed between the eccentric portion of the third member and the second member, so that the stress applied radially inwards to the eccentric portion can be received by the second member.

The planetary gear mechanism is preferably a speed reducing mechanism that reduces the speed of the input from the third member and delivers it to the second member, since the speed can be changed with the mechanism that is available at a low cost and is small in size. As described above, the planetary gear mechanism of the invention is available at a low cost and can be small-sized; therefore, it is preferable to use the planetary gear mechanism as a speed reducer for reducing the speed of the output of a motor in a robot, for example.

In the planetary gear mechanism, the second member is a housing that rotatably supports the first member and the third member, and the first member is an output shaft that delivers driving force applied to the third member, at a reduced speed. With this arrangement, the internally toothed gear can be formed by cutting through the wall of the second member as the housing that surrounds the oscillating member, which makes it easy to produce the planetary gear mechanism.

Also, since the insert holes are formed in the first member as the output shaft, the thickness of the output shaft formed in an end portion can be utilized for provision of the insert holes, and the axial dimension of the planetary gear mechanism can be reduced.

In the planetary gear mechanism, the third member has a counter balancer that cancels out unbalanced rotation of the eccentric portion. With this arrangement, the unbalanced rotation caused by the eccentric portion can be cancelled out, and vibration of the planetary gear mechanism can be suppressed. The construction of the counter balancer is not particularly limited provided that the shape and position of the counter balancer are determined so that it can cancel out the unbalanced rotation of the eccentric portion.

In the planetary gear mechanism, the counter balancer is in the form of a light-weight hole formed by partially hollowing the third member. Thus, the eccentric imbalance load of the third member can be eliminated without increasing the number of components.

In the planetary gear mechanism, the insert hole restricts rotation of the oscillating member via the needle bearing, thus making it possible to reduce losses due to sliding resistance between the first member and the oscillating member, improve the efficiency of the planetary gear mechanism, and increase the output torque.

In the planetary gear mechanism of, the case of the electric motor is formed integrally with the first member or the second member, and the output shaft of the electric motor and the third member are formed integrally with each other. With this arrangement, the number of components can be reduced, and the planetary gear mechanism is available at a low cost.

In the planetary gear mechanism, as the first shaft serving as the input shaft rotates, the oscillating member makes eccentrically oscillating motion via the eccentric portion provided on the first shaft. Then, the externally toothed gear formed on the oscillating member eccentrically oscillates along with the oscillating member. The externally toothed gear externally contacts and engages (meshes) with the internally toothed gear provided on the second shaft, and the circumferential position of a meshing portion in which the externally toothed gear and the internally toothed gear mesh with each other moves due to the eccentrically oscillating motion of the oscillating member. As a result, relative rotation occurs between the housing that restricts rotation of the oscillating member and the second shaft, and rotational output is delivered to the second shaft. The speed change ratio (reduction ratio) is determined by adjusting the number of teeth of the externally toothed gear provided on the oscillating member and the number of teeth of the internally toothed gear. Thus, the planetary gear mechanism of the invention changes (reduces) the speed of rotation of the first shaft as the input shaft, and produce the rotational output at the second shaft.

Also, the planetary gear mechanism of the invention may change (increase) the speed of rotation of the second shaft and deliver it to the first shaft. In this case, the rotation is transmitted via the second shaft, the internally toothed gear, the externally toothed gear, the oscillating member, and the first shaft, in the order of description, while its speed is changed.

In the planetary gear mechanism of the invention, only the engaging faces of the externally toothed gear provided on the oscillating member and the internally toothed gear (the meshing faces of the gears) are required to be machined with high accuracy. In other words, the other members are not required to be machined with high accuracy. Namely, the planetary gear mechanism of the invention is advantageous in that the cost can be reduced by reducing highly accurate machining.

Also, motions (in particular, a rotational motion in the circumferential direction about the axis of the input and output shafts) of the oscillating member other than its eccentrically oscillating motion are advantageously restricted, due to the functions of the first pins that protrude from the oscillating member and the insert holes of the housing.

In the planetary gear mechanism, as the first shaft serving as the input shaft rotates, the oscillating member makes eccentrically oscillating motion via the eccentric portion provided on the first shaft. Then, the externally toothed gear formed on the oscillating member eccentrically oscillates along with the oscillating member. The externally toothed gear externally contacts and engages (meshes) with the internally toothed gear provided on the housing, and the circumferential position of a meshing portion in which the externally toothed gear and the internally toothed gear mesh with each other moves due to the eccentrically oscillating motion of the oscillating member. As a result, relative rotation occurs between the second shaft that restricts rotation of the oscillating member and the housing, and rotational output is delivered to the second shaft.

The speed change ratio (reduction ratio) is determined by adjusting the number of teeth of the externally toothed gear provided on the oscillating member and the number of teeth of the internally toothed gear. Thus, the planetary gear mechanism of the invention changes (reduces) the speed of rotation of the first shaft as the input shaft, and produces the rotational output at the second shaft.

Also, the planetary gear mechanism of the invention may change (increase) the speed of rotation of the second shaft and deliver it to the first shaft. In this case, the rotation is transmitted via the second shaft, the internally toothed gear, the externally toothed gear, the oscillating member, and the first shaft, in the order of description, while its speed is changed.

In the planetary gear mechanism of the invention, only the engaging faces of the externally toothed gear provided on the oscillating member and the internally toothed gear (the meshing faces of the gears) are required to be machined with high accuracy. In other words, the other members are not required to be machined with high accuracy. Namely, the planetary gear mechanism of the invention is advantageous in that the cost can be reduced by reducing highly accurate machining.

Also, the second shaft is advantageously rotated along with the oscillating member while its speed is reduced, due to the functions of the first pins that protrude from the oscillating member, and the insert holes of the second shaft.

Also, when the internally toothed gear is provided, it can be formed by cutting through the wall of the housing that surrounds the oscillating member, which makes it easy to produce the planetary gear mechanism.

Also, since the insert holes are formed in the second shaft, the thickness of the second shaft formed in an end portion can be utilized for provision of the insert holes, and the axial dimension of the planetary gear mechanism can be reduced.

BEST MODES FOR CARRYING OUT THE INVENTION

<First Embodiment>

Figure 1:
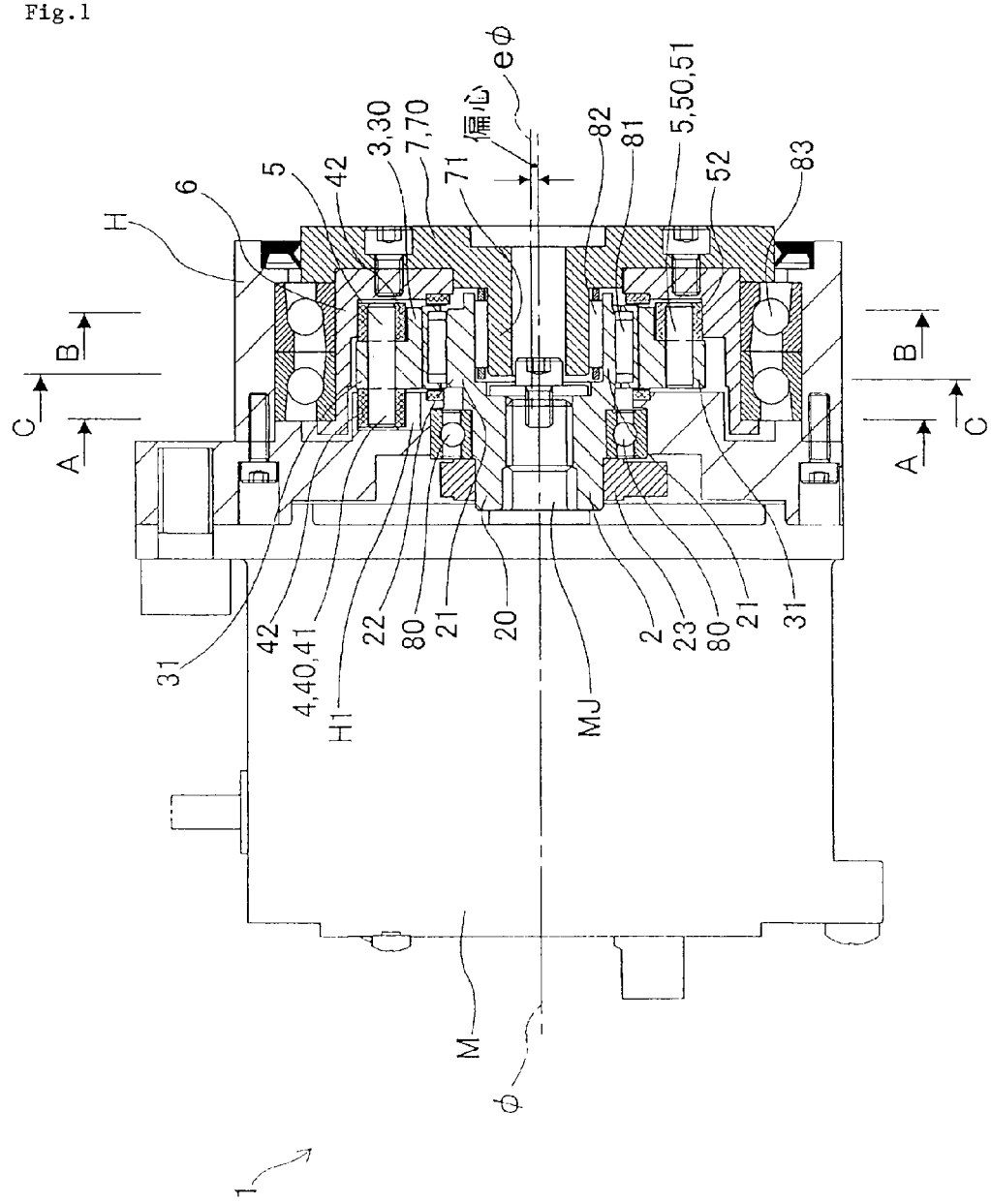
FIG. 1 is a cross-sectional view showing the construction of a speed reducer of a first embodiment.
Figure 2:
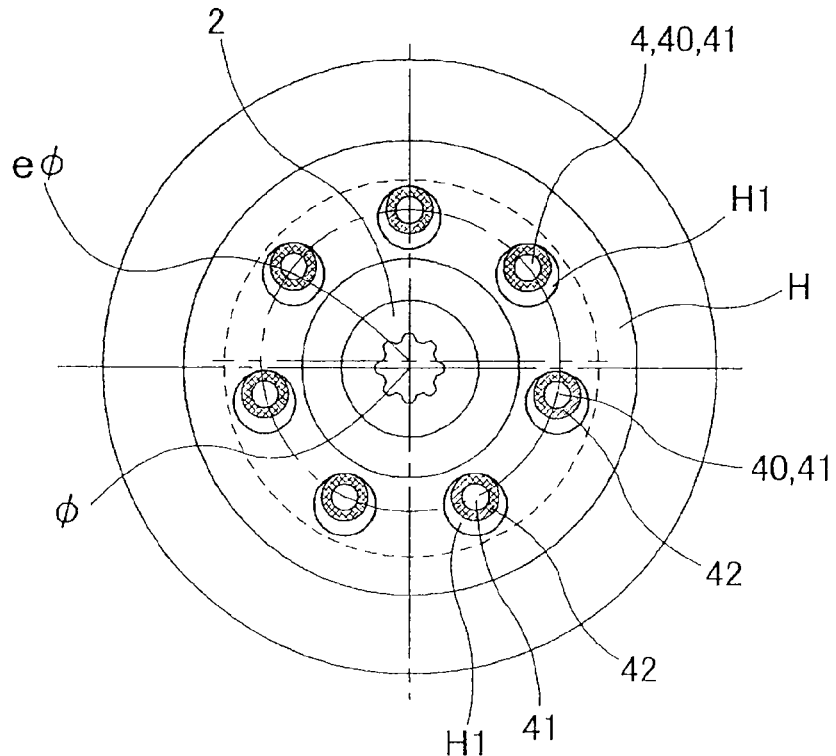
FIG. 2 is a cross-sectional view taken along an A-A section of FIG. 1.
Figure 3:
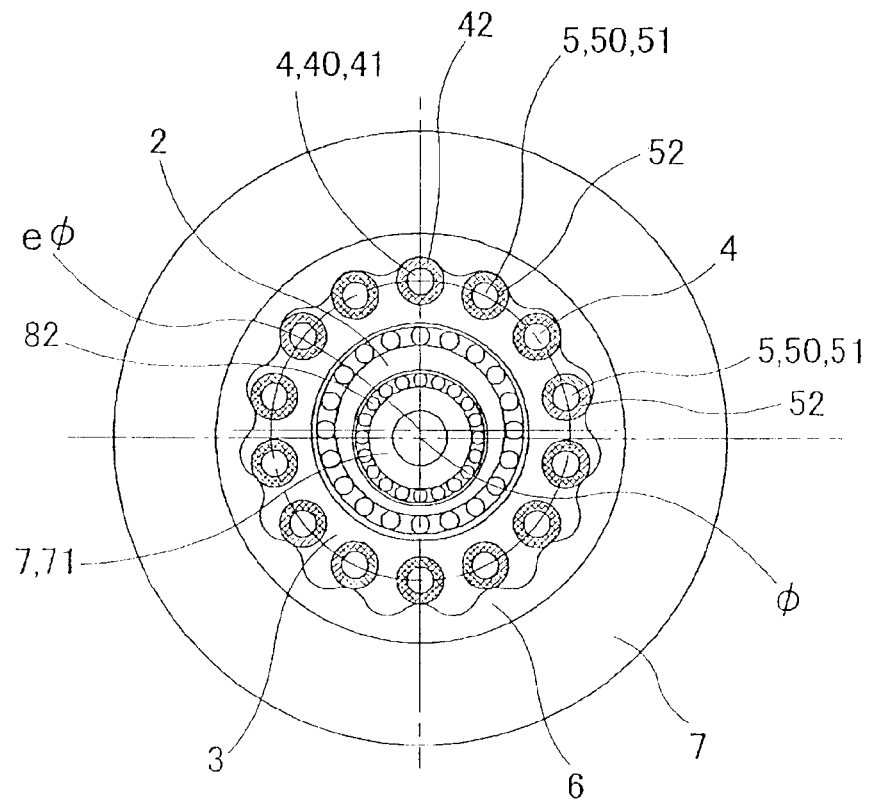
FIG. 3 is a cross-sectional view taken along a B-B section of FIG. 1.
Figure 4:
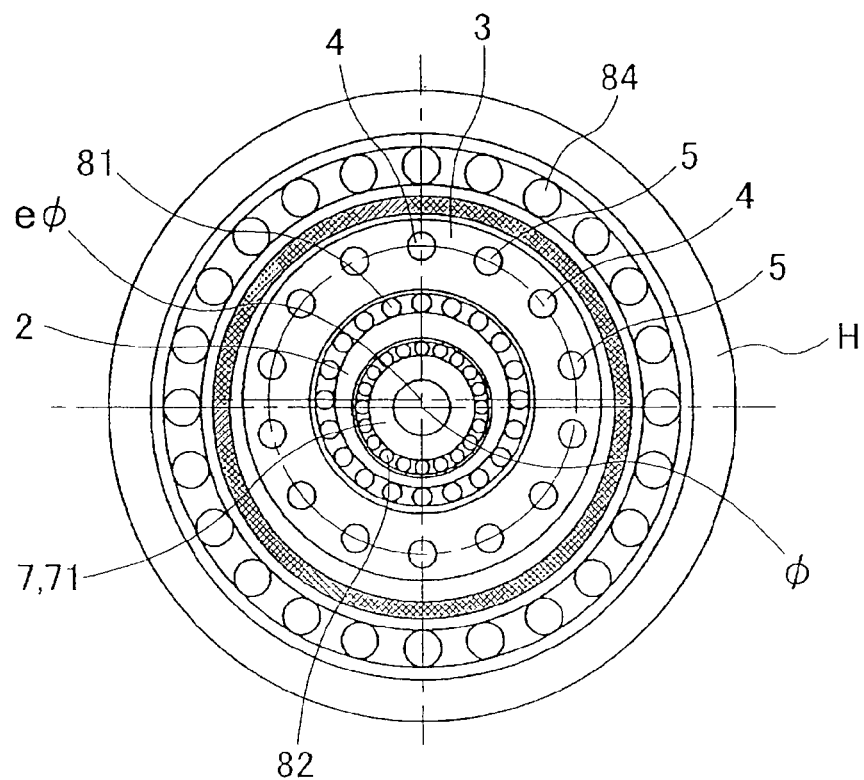
FIG. 4 is a cross-sectional view taken along a C-C section of FIG. 1.

In the following, a first embodiment will be described with reference to FIG. 1 through FIG. 5. FIG. 1 shows a speed reducer 1 in which a planetary gear mechanism of this embodiment is employed. In the speed reducer 1 of this embodiment, driving force of a motor M which is applied to an input shaft 2 is delivered to an output shaft 7 while its speed is reduced. In order to illustrate rotation of the input shaft and the phases of gears, an A-A cross-section in FIG. 1 is shown in FIG. 2, and a B-B cross-section in FIG. 1 is shown in FIG. 3, while a C-C cross-section in FIG. 1 is shown in FIG. 4, respectively.

The speed reducer 1 of this embodiment has a motor M, a housing H, the input shaft 2, an oscillating face plate 3, first pins 4, second pins 5, an internally toothed gear 6, and the output shaft 7.

The motor M (corresponding to the electric motor of this invention) is a member that produces a rotation output. In this embodiment, the motor M is not particularly limited.

The housing H is a member that is secured to the motor M, and forms a part of the outer peripheral shape of the speed reducer 1. Also, the housing H (corresponding to the first member of the invention) rotatably supports and houses members, such as a rotary shaft MJ of the motor M, the input shaft 2 (corresponding to the third member and first shaft of the invention), the oscillating face plate 3 (corresponding to the oscillating member of the invention), the first pins 4, the second pins 5, the internally toothed gear 6, and the output shaft 7 (corresponding to the second member and second shaft of the invention when it includes the internally toothed gear 6). The housing H rotatably supports the input shaft 2 and the output shaft 7 such that the axes of these shafts coincide with each other and provide a common axis (which is the axis of input and output shafts and is denoted by $\phi$ in the figures).

The input shaft 2 is a generally cylindrical member fixed to the rotary shaft MJ of the motor M. The input shaft 2 has a reduced-diameter portion 20 that is fitted on and fixed to the rotary shaft MJ of the motor M, and a cylindrical increased-diameter portion 21 that is located on the distal-end side of the reduced-diameter portion 20 and has larger inside diameter and larger outside diameter than those of the reduced-diameter portion 20. The reduced-diameter portion 20 and the increased-diameter portion 21 are formed such that their diameters change gradually (in steps), as shown in FIG. 1.

The reduced-diameter portion 20 is placed in a rotatable condition, with an input shaft supporting bearing 80 interposed between the reduced-diameter portion 20 and the housing H.

The increased-diameter portion 21 includes an eccentric portion 22 having a radially outer circumferential surface that has an eccentric shape with its center displaced from the axis of the input shaft 2. Namely, as the input shaft 2 rotates about the axis of the input and output shafts, the eccentric portion 22 also rotates about the axis of the input and output shafts, while oscillating its outer circumferential surface. The outer circumferential surface of the eccentric portion 22 is formed in the shape of a true circle whose center lies on an eccentric axis (denoted by e$\phi$ in the figures) located at a different position from the axis of the input and output shafts.

Figure 5:
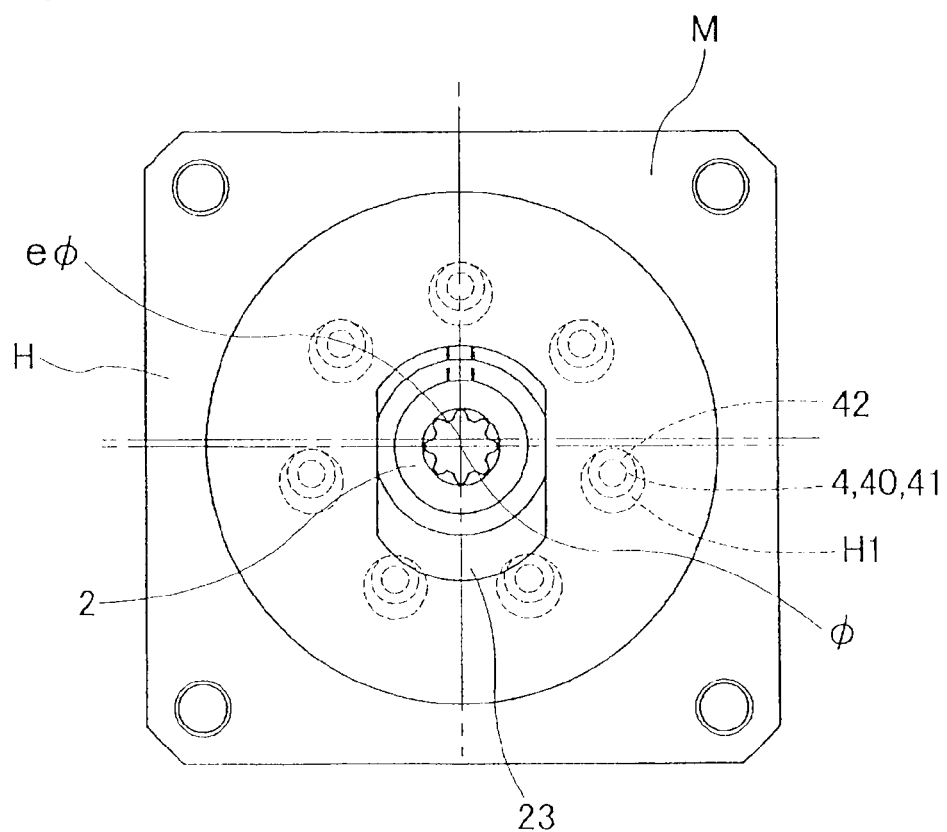
FIG. 5 is a view showing a counter balancer of the speed reducer of the first embodiment.

The input shaft 2 is provided with a counter balancer 23 located closer to the motor M than a portion of the reduced-diameter portion 20 which is supported by the housing H. The counter balancer 23 is positioned so as to cancel out unbalanced rotation caused by the eccentric portion 22. More specifically, the counter balancer 23 is mounted such that its phase is opposite to that of the eccentric shape of the eccentric portion 22, as shown in FIG. 5. FIG. 5 is a schematic view as seen from the output shaft 7 side toward the motor M, which makes a phase difference between the oscillating face plate 3 and the counter balancer 23 understood.

The oscillating face plate 3 is a generally annular member in which (the eccentric portion 22 of) the increased-diameter portion 21 is inserted via a first support bearing 81. In this embodiment, the oscillating face plate 3 has a cylindrical portion 30 in which (the eccentric portion 22 of) the increased-diameter portion 21 is inserted via the first support bearing 81, and a disc-shaped disc portion 31 that extends perpendicularly to the axial direction at one end portion of the cylindrical portion 30 closer to the motor M. The cylindrical portion 30 is supported by the eccentric portion 22 via the first support bearing 81.

The disc portion 31 of the oscillating face place 3 is formed with a pair of side faces that face in opposite directions in the axial direction of the input and output shafts, and a plurality of first pins 4 and second pins 5 are respectively provided at equal intervals, along the circumferential direction, on the respective side faces. The plurality of first pins 4 protrude from one surface of the disc portion 31 of the oscillating face plate 3 toward the motor M, in a direction parallel to the axial direction of the input shaft 2. The plurality of second pins 5 protrude from the other surface of the disc portion 31 of the oscillating face plate 3 away from the motor M, in a direction parallel to the axial direction of the input shaft 2. The first pins 4 and the second pins 5 are provided on the same circumference having a center on the eccentric axis, and the first pins 4 are disposed coaxially with the second pins 5. In this embodiment, seven first pins 4 and fourteen second pins 5 are provided, as shown in FIG. 2 and FIG. 3. The second pins 5 form a gear corresponding to the externally toothed gear.

In this embodiment, the first pins 4 and a part of the second pins 5 form integrally formed long pins 40. The long pins 40 are formed by integrating the first pins 4 and a part of the second pins 5, such that the long pins 40 extend through the disc portion 31 of the oscillating face plate 3. The remaining second pins 5 are not formed integrally with the first pins 4, but form short pins 50 that are shorter than the long pins 40. The second pins 5 that form the long pins 40 are alternately located pins, out of the second pins 5 arranged in the circumferential direction. Namely, the long pins 40 and the short pins 50 are alternately provided in the circumferential direction about the eccentric axis of the oscillating face plate 3.

The first pins 4 are inserted in insert holes H1 that are open on the housing H. A part of the outer circumferential surface of each first pin 4 is in contact with the inner circumferential surface of the corresponding insert hole H1. The insert holes H1 restrict rotation of the oscillating face plate 3 about the eccentric axis relative to the housing H, via the inserted first pins 4. The insert hole H1 is a concave hole or recess having a circular, inner circumferential shape.

At the outer circumferential surface of the oscillating face plate 3, the externally toothed gear formed by the plurality of second pins 5 internally contacts and engages with (or meshes with) the internally toothed gear 6. With the internally toothed gear 6 and the externally toothed gear engaged with each other, the oscillating face plate 3 can make eccentrically oscillating motion so that the eccentric axis revolves about the axis of the input and output shafts. As a result, the oscillating face plate 3 oscillates relative to the housing H and the output shaft 7, and only a part of the circumference of the externally toothed gear meshes with the internally toothed gear 6.

As shown in FIG. 1, the long pins 40 and short pins 50 formed from the first pins 4 and second pins 5 are comprised of columnar pin bodies 41, 51 fixed to the oscillating face plate 3 such that they protrude from the plate 3, and cylindrical collars 42, 52 rotatably fitted on the pin bodies 41, 51.

The internally toothed gear 6 is a member that internally contacts and meshes with the second pins 5, and is an annular member having a hypotrochoid tooth profile formed in its inner circumferential surface. The annular internally toothed gear 6 is positioned such that its center axis coincides with the axis of the input and output shafts. In this embodiment, the internally toothed gear 6 is formed with fifteen teeth, namely, the number of the teeth of the gear 6 is larger by one than the number of the second pins 5.

The internally toothed gear 6 is fixed to the output shaft 7. The output shaft 7 consists of a disc-shaped portion 70 shaped like a disc, and an insert portion 71 that protrudes from the disc-shaped portion 70 toward the motor M and is inserted into the center of the increased-diameter portion 21 of the input shaft 2. The output shaft 7 is supported by the housing H via an output shaft supporting hearing 83, such that the output shaft 7 is rotatable about the axis of the input and output shafts.

While the insert portion 71 of the output shaft 7 is inserted into the center of the increased-diameter portion 21 of the input shaft 2, this insert portion 71 is mounted with a second support bearing 82 interposed between the insert portion 71 and the inner circumferential surface of the increased-diameter portion 21.

Next, the operation of the speed reducer 1 of this embodiment will be described.

Initially, the motor M is operated. The input shaft 2 rotates via the rotary shaft MJ of the motor M. As the input shaft 2 rotates, the eccentric portion 22 that constitutes the input shaft 22 rotates, to oscillate its outer circumferential surface (eccentric rotation). Since the input shaft 2 is provided with the counter balancer 23, an imbalance in rotation which appears when the eccentric portion 22 eccentrically rotates about the eccentric axis is cancelled out or eliminated.

The eccentric rotation of the eccentric portion 22 causes the oscillating face plate 3 to make oscillating motion (eccentrically oscillating motion) via the first support hearing 81. At this time, the first pins 4 are inserted in the insert holes H1 of the housing H, and rotation of the oscillating face plate 3 about the axis of the input and output shafts relative to the housing H is restricted, so that the oscillating face plate 3 undergoes the oscillating motion.

As the oscillating face plate 3 makes the oscillating motion, the second pins 5 provided on the oscillating face plate 3 also make oscillating motion. As the second pins 5 make oscillating motion, the circumferential position at which the externally toothed gear and the internally toothed gear 6 mesh with each other moves, and the internally toothed gear 6 with which the second pins 5 internally contact and mesh rotates about the axis of the input and output shafts (the center axis of the input shaft 2 and the output shaft 7). Namely, a rotational component is taken out of the oscillating motion of the oscillating face plate 3. The rotation of the internally toothed gear 6 is transmitted to the output shaft 7, and output rotation is delivered from the output shaft 7. In this connection, the reduction ratio is determined by the number of the second pins 5 and the number of the meshing teeth of the internally toothed gear 6. With the speed reducer 1 of this embodiment having the above-described mechanism, the speed of rotation of the input shaft 2 is reduced, and the resulting rotation is delivered from the output shaft 7.

In the planetary gear mechanism of the speed reducer 1 of this embodiment, high machining or working accuracy is required in formation of only the abutting faces (meshing faces) of the second pins 5 fixed to the oscillating face plate 3 and the internally toothed gear 6. In other words, high machining or working accuracy is not required in formation of the other portions. Namely, the working cost can be advantageously reduced.

Since the first pins 4 and the second pins 5 are formed on the same circumference, the outside diameter of the oscillating face plate 3 can be minimized for provision of the first pins 4 and the second pins 5, and the size of the planetary gear mechanism can be reduced.

Also, with the arrangement in which at least one pair of second pin 5 and first pin 4 is formed on the same axis, only one through-hole that extends through the opposite side faces of the oscillating lace plate 3 may be provided for provision of one first pin 4 and one second pin 5. Thus, the planetary gear mechanism can be easily produced.

Also, since the number of the first pins 4 is smaller than the number of the second pins 5, the diameter of the circumference on which the first pins 4 are formed may be made smaller than the diameter of the circumference on which the second pins 5 are provided, and the size of the oscillating face plate 3 on which the first pins 4 and the second pins 5 are formed can be reduced.

Namely, a given number or more of second pins 5 must be provided for reduction of surface pressures that act on the externally toothed gear that transmits rotary force. However, the number of the first pins 4 for restricting rotation of the oscillating face plate 3 is determined with a relatively high degree of freedom. Accordingly, the number of the first pins 4 may be reduced to be smaller than the number of the second pins 5, and the first pins 4 may be placed on a small-diameter circumference, while the second pins 5 may be placed on a large-diameter circumference. With this arrangement, the first pins 4 and the second pins 5 can be reasonably positioned, and the size of the oscillating face plate 3 can be reduced.

Also, while two types of pins, i.e., inner pins and outer pins are required to be provided in the known planetary gear mechanism, the number of components can be advantageously reduced by suitably setting the long pins 40 and the short pins 50 in the planetary gear mechanism of the speed reducer 1 of this embodiment.

Furthermore, inner pin holes through which the inner pins extend need to be formed in the externally toothed gear in the known planetary gear mechanism, and there is a limitation to reduction of the outside diameter of the externally toothed gear itself. In the planetary gear mechanism of the speed reducer 1 of this embodiment, however, the second pins 5 are fixed to the oscillating face plate 3, and the oscillating face plate 3 itself does not require large space like the inner pin holes. Consequently, the planetary gear mechanism of the speed reducer 1 of this embodiment advantageously permits reduction of the outside diameter thereof.

Also, in the planetary gear mechanism of the speed reducer 1 of this embodiment, the input shaft 2 has the counter balancer 23 that cancels out unbalanced rotation of the eccentric portion 22, on the motor M side, so that the unbalanced rotation caused by the eccentric portion 22 is cancelled out by the counter balancer 23. Namely, in the planetary gear mechanism of the speed reducer 1 of this embodiment, the speed reducer 1 is less likely or unlikely to suffer from vibrations. Further, since the counter balancer 23 having a simple shape can be used in the planetary gear mechanism of the speed reducer 1 of this embodiment, the working cost can be advantageously reduced.

Also, in the planetary gear mechanism of the speed reducer 1 of this embodiment, sliding contacts between the long pins 40 and the short pins 50 that provide the first pins 4 and the second pins 5, and the insert holes H1 of the housing H and the internally toothed gear 6 are formed or established by collars 42, 52 fitted on the pin bodies 41, 51. When the first pins 4 and the insert holes H1, and the second pins 5 and the internally toothed gear 6 are brought into sliding contact with each other, slips of the tooth faces can be absorbed by rotation of the collars 42, 52, and highly efficient meshing can be achieved.

Furthermore, in the planetary gear mechanism of the speed reducer 1 of this embodiment, backlash of the meshing faces can be easily adjusted by adjusting the outside diameters of the collars 42, 52. Namely, the working cost can be advantageously reduced.

In addition, in the planetary gear mechanism of the speed reducer 1 of this embodiment, the reaction force applied radially inwards from the internally toothed gear 6 to the second pins 5 acts on the insert portion 71 of the output shaft 7, via the oscillating face plate 3, the first support bearing 81, the increased-diameter portion 21 of the input shaft 2, and the second support bearing 82. Namely, the force with which the second pins 5 and the internally toothed gear 6 mesh with each other is used without loss.

<Modified Example of First Embodiment>

While the externally toothed gear is formed by the second pins 5 provided on the oscillating face plate 3, and the internally toothed gear 6 is formed by the hypotrochoidal gear in the first embodiment as described above, the externally toothed gear may be formed by a hypotrochoidal gear, and the internally toothed gear may be formed by pins.

As described above, the speed reducer 1 of each embodiment reduces the speed of rotation of the motor M using a small-sized device. Namely, the planetary gear mechanism of the invention is preferably used in, in particular, a small-sized robot, or the like.

<Another Modified Example of First Embodiment>

In the first embodiment as described above, the gear mechanism of the invention is applied to the speed reducer 1 that transmits driving force of the motor M applied to the input shaft 2, to the output shaft 7, while reducing its speed. However, the gear mechanism may be applied to a speed increasing device that transmits driving force applied to the output shaft 7, to the input shaft 2, while increasing its speed.

<Second Embodiment>

Figure 6:
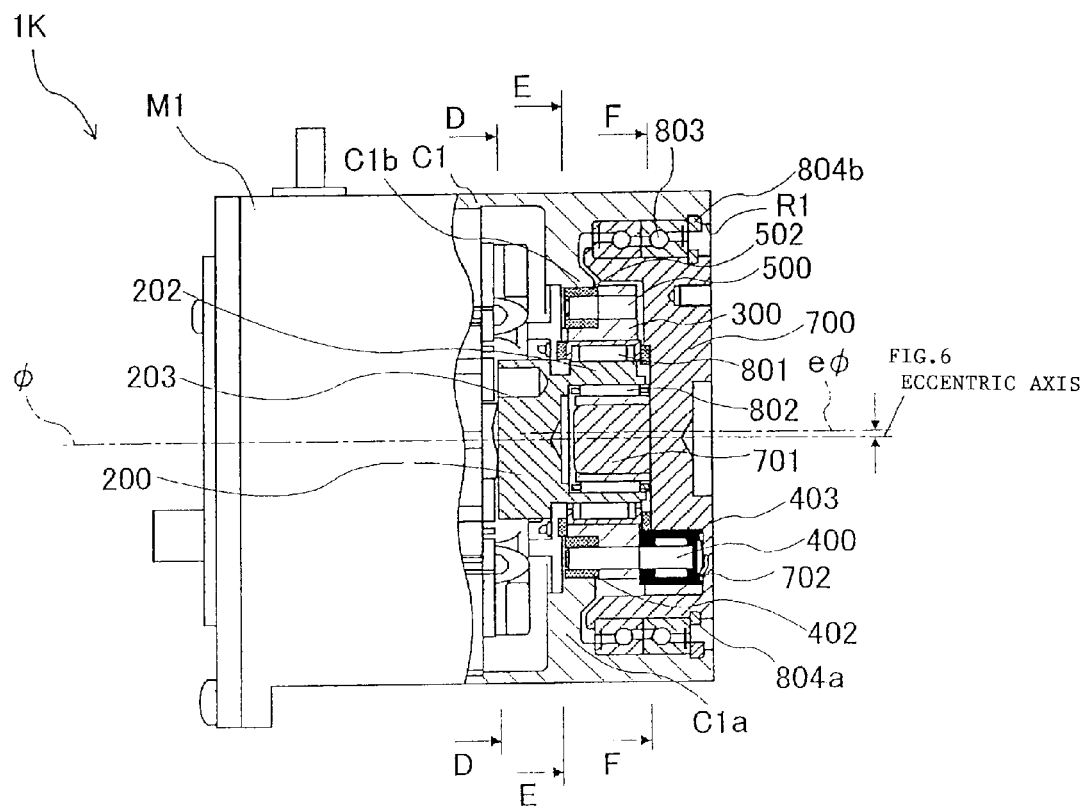
FIG. 6 is a cross-sectional view showing the construction of a speed reducer of a second embodiment.

Next, only differences of a speed reducer 1K according to a second embodiment from the speed reducer 1 as described above will be described with reference to FIG. 6 through FIG. 9. As shown in FIG. 6, a case C1 (corresponding to the second member of the invention) of a motor M1 (corresponding to the electric motor of the invention) is formed integrally with a housing of the speed reducer 1K. The case C1 also serves as the housing of the speed reducer 1K, and rotatably supports an output shaft 700 (corresponding to the first member of the invention) via an output shaft supporting bearing 803.

The output shaft supporting bearing 803 is fixed in position with a pair of locating snap rings (circlips) 804a, 804b mounted at the inner and outer peripheries of an axial end portion of an annular mounting hole R1 formed between the case 1 and the output shaft 700. With this arrangement, the structure can be simplified, and the output shaft supporting hearing 803 can be mounted with improved efficiency and easiness.

Also, an output shaft 200 (corresponding to the third member of the invention and the output shaft of the electric motor) protrudes from the motor M1, and the output shaft 200 is formed integrally with an input shaft of the speed reducer 1K so as to also serve as the input shaft. An eccentric portion 202 having an outer circumferential surface whose center is displaced from the axis of the input and output shafts (denoted by φ in the drawings) is formed at a distal end portion of the output shaft 200. An insert portion 701 of the output shaft 700 is inserted into a space formed radially inwardly of the eccentric portion 202, and a second support hearing 802 is interposed between an inner circumferential surface of the eccentric portion 202 and the insert portion 701.

Figure 7:
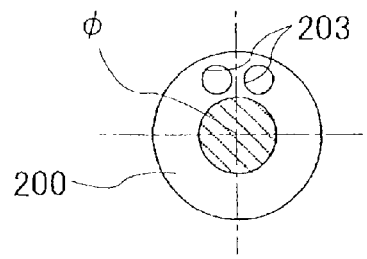
FIG. 7 is a cross-sectional view taken along a D-D section of FIG. 6.

A counter balancer 203 is formed in a rear end portion of the output shaft 200, so as to cancel out unbalanced rotation caused by the eccentric portion 202 of the output shaft 200. The counter balancer 203 consists of light-weight holes formed by partially hollowing the output shaft 200. The light-weight holes are formed at the same circumferential position as a large-weight portion of the eccentric portion 202 where the outer circumferential surface protrudes radially outwards with respect to the axis of the input and output shafts as a center (as shown in FIG. 7).

An oscillating face plate 300 is mounted on the outer circumferential surface of the eccentric portion 202 of the output shaft 200 via a first support bearing 801. The oscillating face plate 300 is formed to be able to oscillate along with the eccentric portion 202, due to rotation of the output shaft 200 about the axis of the input and output shafts.

Figure 8:
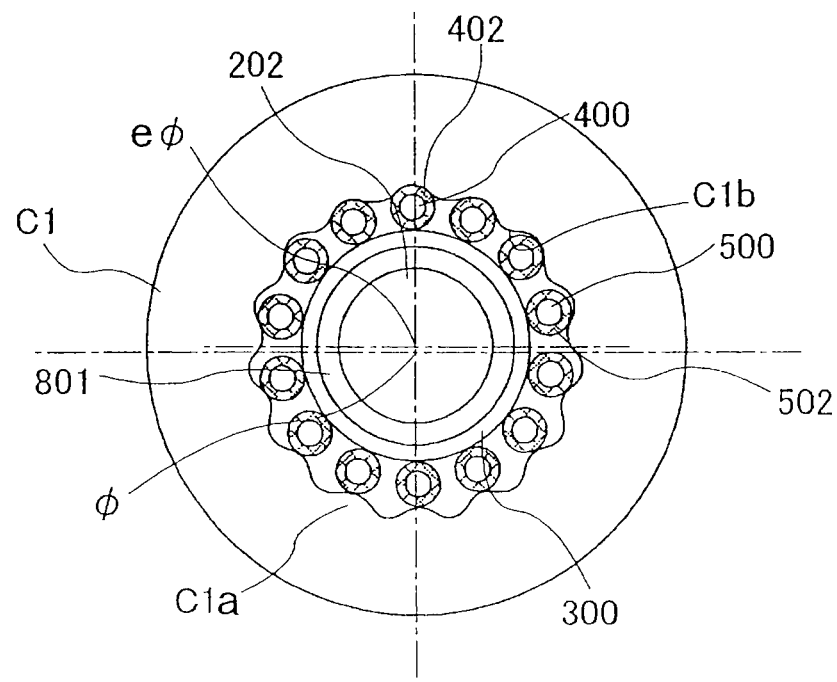
FIG. 8 is a cross-sectional view taken along an E-E section of FIG. 6.
Figure 9:
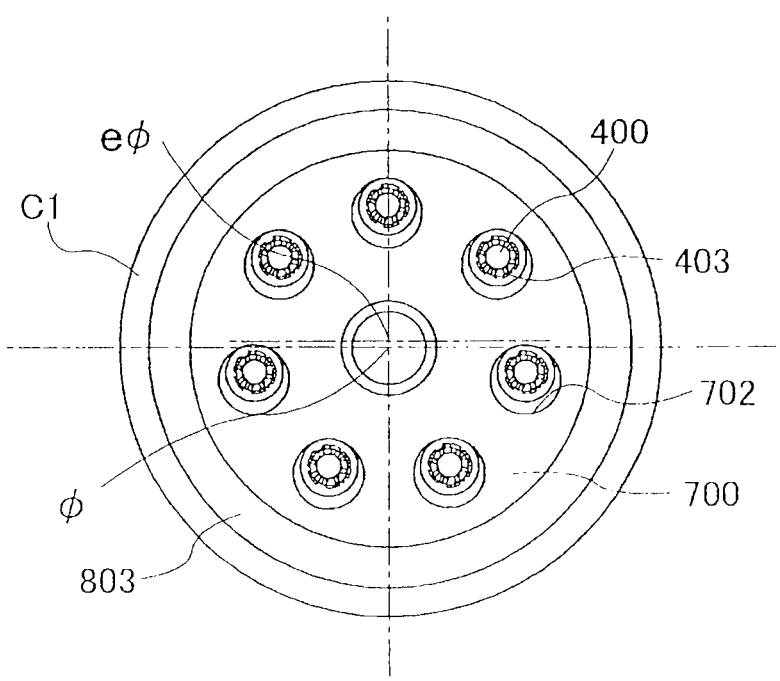
FIG. 9 is a cross-sectional view taken along an F-F section of FIG. 6.

On the outer circumferential surface of the oscillating face plate 300, seven short pins 500 and seven long pins 400 are alternately mounted. The short pins 500 and the long pins 400 both extend in the direction of the axis of the input and output shafts, and collars 502, 402 are respectively mounted on distal end portions (corresponding to the second pins of the invention) of the short pins 500 and distal end portions (also corresponding to the second pins of the invention) of the long pins 400 closer to the motor M1. The distal end portions of the short pins 500 and the distal end portions of the long pins 400 closer to the motor M1 form an externally toothed gear similar to that of the first embodiment (as shown in FIG. 8).

The case C1 of the motor M1 is formed with a support portion C1a that extends radially inwards, and a hypotrochiod type internally toothed gear C1b similar to that of the first embodiment is provided on the inner circumferential surface of the support portion C1a. The internally toothed gear C1b is formed with fifteen teeth, namely, the number of the teeth of the internally toothed gear C1b is larger by one than that of the externally toothed gear. A circumferential portion of the internally toothed gear C1b meshes with the distal end portions of the short pins 500 and the distal end portions of the long pins 400, via the collars 502, 402.

On the other hand, needle bearings 403 are mounted on distal end portions (corresponding to the first pins of the invention) of the long pins 400 remote from the motor M1. Also, insert holes 720 are formed in the output shaft 700 so that the distal end portions of the long pins 400 remote from the motor M1 are inserted into the insert holes 720. The output shaft 700 permits oscillation of the oscillating face plate 300, and restricts relative rotation of the oscillating face plate 300, through abutting contact of the insert holes 702 with the long pins 400 via the needle bearings 403.

The other features in construction are similar to those of the speed reducer 1 according to the first embodiment, and therefore, further explanation will not be provided.

Next, the operation of the speed reducer 1K will be described. When the motor M1 is operated, the output shaft 200 rotates. As the output shaft 200 rotates, the eccentric portion 202 that constitutes the output shaft 200 rotates eccentrically. The eccentric rotation of the eccentric portion 202 causes the oscillating face plate 300 to make oscillating motion (eccentrically oscillating motion) via the first support bearing 801.

As the oscillating face plate 300 makes the oscillating motion, the externally toothed gear formed by the short pins 500 and long pins 400 provided on the oscillating face plate 300 also makes oscillating motion. Here, the internally toothed gear C1b that meshes with the externally toothed gear is formed on the case C1, and is therefore unable to rotate, unlike that of the first embodiment. Therefore, as the externally toothed gear makes the oscillating motion, the oscillating face plate 300 itself rotates while oscillating.

At this time, the output shaft 700 is rotated at a reduced speed along with the oscillating face plate 300, since the long pins 400 are inserted in the insert holes 702 of the output shaft 700, and rotation of the oscillating face plate 300 relative to the output shaft 700 is restricted. Namely, the oscillating motion of the oscillating face plate 300 causes the output shaft 700 to produce a reduced-speed rotation output.

According to the second embodiment, the internally toothed gear is formed in the case C1; therefore, the internally toothed gear can be formed by cutting through the wall (the support portion C1a) of the case C1 as the housing, resulting in easy production thereof.

Also, the insert holes 702 are formed in the output shaft 700; therefore, the thickness of the output shaft 700 formed in an axially end portion can be utilized for provision of the insert holes 702, and the axial dimension of the speed reducer 1K can be reduced.

Also, the counter balancer 203 consists of light-weight holes formed by partially hollowing the output shaft 200; therefore, the eccentric imbalance load of the output shaft 200 can be eliminated without increasing the number of components.

Also, the insert holes 702 of the output shaft 700 restrict rotation of the oscillating face plate 300 via the needle bearings 403; therefore, losses due to sliding resistance between the output shaft 700 and the oscillating face plate 300 can be reduced, and the efficiency of the speed reducer 1K is improved, resulting in increase of the output torque.

Also, the case C1 of the motor M1 is formed integrally with the housing of the speed reducer 1K, and the output shaft 200 of the motor M1 is formed integrally with the input shaft of the speed reducer 1K. This arrangement makes it possible to eliminate the input shaft supporting bearing 80 shown in the first embodiment, and thus reduce the number of components, so that the speed reducer 1K is available at a reduced cost.

<Modified Example of Second Embodiment>

In the speed reducer 1K, the output shaft 700 may be nonrotatably fixed, and the case C1 may be rotatable about the axis of the input and output shafts. Also, the output shaft 700 and the case C1 are both rotatable about the axis of the input and output shafts, and reduced-speed rotation may be delivered at a given ratio to the output shaft 700 and the case C1, respectively.

In the speed reducer 1 of the first embodiment, light-weight holes serving as the counter balancer 23 may be provided in the input shaft 2.

In the speed reducer 1 of the first embodiment, needle bearings 403, instead of the collars 42, may be mounted on the long pins 40.

In the speed reducer 1 of the first embodiment, the input shaft 2 may be formed integrally with the rotary shaft MJ of the motor M, and the housing H may be formed integrally with the case of the motor M.

EXPLANATION OF REFERENCE NUMERALS 1, 1K: Speed Reducer 2: Input Shaft 20: Reduced-diameter Portion 21: Increased-diameter Portion 22, 202: Eccentric Portion 23, 203: Counter Balancer 3, 300: Oscillating Face Plate 30: Cylindrical Portion 31: Disc Portion 4: First Pin 40, 400: Long Pin 41: Pin Body 42: Collar 5: Second Pin 50, 500: Short Pin 51: Pin Body 52: Collar 6, C1b: Internally Toothed Gear 7, 700: Output Shaft 70: Disc-shaped Portion 71, 701:

Insert Portion 80: Input Shaft Supporting Bearing 81, 801: First Support Bearing 82, 802: Second Support Bearing 83, 803: Output Shaft Supporting Bearing 200: Output Shaft 403: Needle Bearing C1: Case H1, 702: Insert Hole M, M1: Motor φ: Axis of Input and Output Shafts eφ: Eccentric Axis

The invention claimed is:

1. A planetary gear mechanism comprising:
 a first member;
 a second member that includes an internally toothed gear formed in an inner circumferential surface thereof and that is rotatable relative to the first member about an axis of input and output shafts;
 an oscillating member that is formed in an annular shape and that includes an externally toothed gear formed in an outer circumferential surface thereof to mesh with the internally toothed gear, a number of teeth of the externally toothed gear being less than a number of teeth of the internally toothed gear, the oscillating member being formed so as to oscillate relative to the second member so that only a circumferential portion of the externally toothed gear meshes with the internally toothed gear, and the oscillating member being able to oscillate relative to the first member while rotation thereof relative to the first member is restricted; and
 a third member including an eccentric portion, a center of an outer circumferential surface of the eccentric portion being displaced from the axis of input and output shafts, and the eccentric portion being operable to rotate about the axis of input and output shafts while supporting an inner circumferential surface of the oscillating member, thereby to oscillate the oscillating member, or being rotated about the axis of input and output shafts due to oscillation of the oscillating member,
 wherein
  a driving force is applied to the third member to oscillate the oscillating member and to move a circumferential position at which the externally toothed gear and the internally toothed gear mesh with each other, so that the driving force is delivered at a reduced speed to at least one of the first member and the second member, or
  the driving force is applied to at least one of the first member and the second member so as to move the circumferential position at which the externally toothed gear and the internally toothed gear mesh with each other, and oscillate the oscillating member, so that the driving force is delivered at an increased speed to the third member,
 wherein:
  a first pin protrudes from one of the oscillating member and the first member in a direction of the axis of input and output shafts; and
  one of the oscillating member and the first member includes an insert hole into which the first pin is inserted, so that rotation of the oscillating member relative to the first member is restricted via the first pin,
 wherein the externally toothed gear is formed by a plurality of second pins that protrude from the oscillating member in the direction of the axis of input and output shafts, and
 wherein:
  the oscillating member includes a first side face and a second side face that face in opposite directions in the direction of the axis of input and output shafts,
  the first pin protrudes from the first side face of the oscillating member, and the second pins protrude from the second side face of the oscillating member, and
  the first pin and the second pins are formed on the same circumference.

2. The planetary gear mechanism according to claim 1, further comprising a plurality of first pins,
 wherein a number of the first pins is less than a number of the second pins.

3. The planetary gear mechanism according to claim 1, wherein the internally toothed gear has a hypotrochoid tooth profile.

4. The planetary gear mechanism according to claim 1, wherein the first pin has a pin body and a collar that is rotatably fitted on the pin body.

5. The planetary gear mechanism according to claim 1, wherein each of the second pins has a pin body and a collar that is rotatably fitted on the pin body.

6. The planetary gear mechanism according to claim 1, wherein a first support bearing is disposed in a radial spacing between the eccentric portion of the third member and the oscillating member.

7. The planetary gear mechanism according to claim 1, wherein
 a needle bearing is mounted on a distal end portion of the first pin; and
 the insert hole restricts rotation of the oscillating member via the needle bearing.

8. The planetary gear mechanism according to claim 1, wherein:
 the third member is driven by an electric motor;
 a case of the electric motor is formed integrally with the first member or the second member; and
 an output shaft of the electric motor and the third member are integrally formed.

9. The planetary gear mechanism according to claim 1, wherein:
 a part of the second member is inserted in a central portion of the third member; and
 a second support bearing is disposed between the third member and the insert portion of the second member inserted in the third member.

10. The planetary gear mechanism according to claim 9, wherein the second support bearing is disposed between the eccentric portion of the third member and said part of the second member inserted in the third member.

11. The planetary gear mechanism according to claim 1, wherein at least one of the second pins and the first pin are formed on the same axis.

12. The planetary gear mechanism according to claim 11, wherein at least one of the second pins and the first pin are formed integrally with each other to form a long pin.

13. The planetary gear mechanism according to claim 12, further comprising a plurality of first pins,
 wherein:
  a plurality of second pins are formed integrally with a corresponding plurality of first pins to form a plurality of long pins;
  the second pins that are not formed integrally with first pins are short pins having a length that is shorter than a length of the long pins; and
  the long pins and the short pins are alternately provided in a circumferential direction of the oscillating member about a center located at a position different from the axis of input and output shafts.

14. The planetary gear mechanism according to claim 1, wherein the planetary gear mechanism is a speed reducing mechanism in which the third member serves as an input shaft, and the second member serves an output shaft.

15. The planetary gear mechanism according to claim 1, wherein:
- the second member is a housing that rotatably supports the first member and the third member;
- the first member is an output shaft that delivers driving force applied to the third member, at a reduced speed;
- the first pin protrudes from the oscillating member; and
- the insert hole into which the first pin is inserted is formed in the first member.

16. The planetary gear mechanism according to claim 1, wherein the third member has a counter balancer that cancels out unbalanced rotation of the eccentric portion.

17. The planetary gear mechanism according to claim 16, wherein the counter balancer comprises a light-weight hole formed by partially hollowing the third member.

\* \* \* \* \*